(12) United States Patent
Bolstad

(10) Patent No.: US 7,281,349 B1
(45) Date of Patent: Oct. 16, 2007

(54) STAKE ASSEMBLY FOR ANIMAL TRAPS

(76) Inventor: Duane Bolstad, East 3806 Countryroad North, Desoto, WI (US) 54624

( * ) Notice: Subject to any disclaimer, the term of this patent is extended or adjusted under 35 U.S.C. 154(b) by 75 days.

(21) Appl. No.: 11/258,558

(22) Filed: Oct. 26, 2005

(51) Int. Cl.
*A01M 23/00* (2006.01)
*A01M 23/24* (2006.01)

(52) U.S. Cl. ............... 43/85; 43/58; 43/86; 43/87; 43/96

(58) Field of Classification Search ............ 43/58–123; 52/154, 153
See application file for complete search history.

(56) References Cited

U.S. PATENT DOCUMENTS

| 425,385 | A |   | 4/1890  | McKay     |         |
|---------|---|---|---------|-----------|---------|
| 4,144,843 | A | * | 3/1979  | Schrougham | 119/786 |
| 4,226,042 | A | * | 10/1980 | Gilbert   | 43/96   |
| 4,831,798 | A |   | 5/1989  | Otteson   |         |
| 5,515,656 | A | * | 5/1996  | Mihalich  | 52/155  |
| 5,625,983 | A |   | 5/1997  | Lachance et al. | |
| D421,822 | S |   | 3/2000  | Van Hale  |         |

\* cited by examiner

*Primary Examiner*—Darren W. Ark
*Assistant Examiner*—John Davis Holman

(57) ABSTRACT

An assembly includes an anchor plate that is formed from steel and has opposing sides spaced from the axis and extends parallel thereto. The anchor plate is further provided with spaced apertures formed therein. One elongated stake is inserted through one aperture and interfitted into the ground so that the anchor plate is prohibited from being disengaged from the ground. A chain includes child links connected end-to-end and parent links having a greater thickness and diameter than the child links. The parent links are fastened to one of the apertures and the animal trap, and are fastened to outer ones of the child links. The chain is formed from steel. The anchor plate and one stake resist external forces acting on the chain so that the animal trap is prevented from moving beyond a maximum distance defined by a length of the chain.

10 Claims, 3 Drawing Sheets

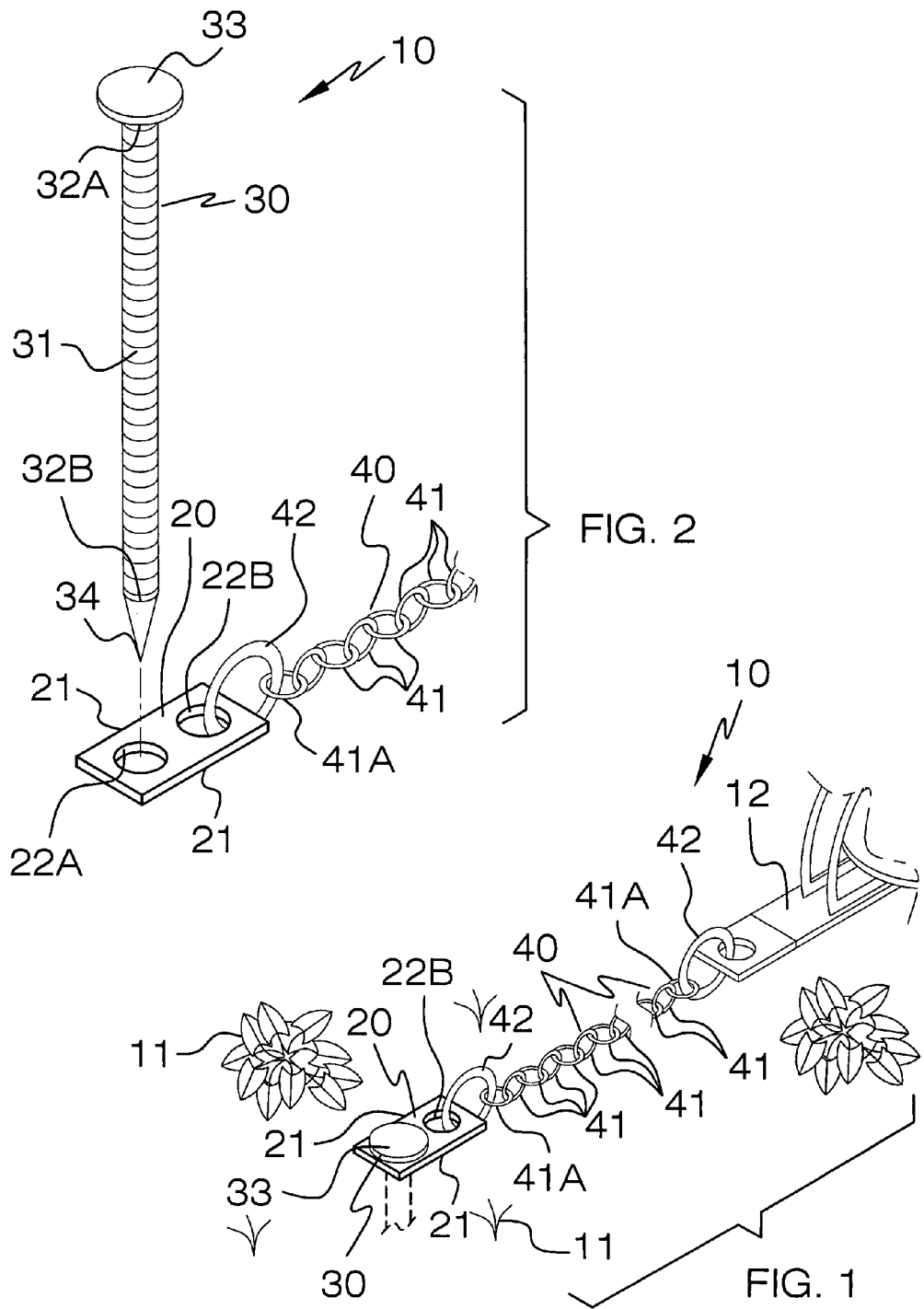

STAKE ASSEMBLY FOR ANIMAL TRAPS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to stake assemblies and, more particularly, to a stake assembly for securing animal traps to a ground surface.

2. Prior Art

Stakes have long been used to securely anchor various types of devices at desired locations in undeveloped areas of ground. Such stakes are generally designed so as to resist the withdrawal thereof from the ground, thereby permitting these devices to be reliably retained therein. Typically, one end of a chain, rope, or similar connecting member is attached to the stake. The other end of the connecting member is attached to the device (which may be an animal trap, tent, and the like), so as to provide a reliable anchor for the device in the ground at that particular location.

Many different stake structures are known in the art for accomplishing this anchoring function. However, stakes of the prior art suffer from several deficiencies. First, many prior art stakes do not, of themselves, provide a universal pivoting connection between the stake and the connecting member. Consequently, the connecting member often becomes tangled or wrapped about the stake. Of those prior art stakes which do provide such a universal pivoting connection, additional hardware is required, thus increasing the expense and complexity thereof.

Second, most prior art stakes do not readily permit a second stake to be used in a multiple staking arrangement with the first stake. Multiple staking arrangements involve the use of two or more stakes which engage or are otherwise connected to each other in the ground so as to increase the amount of force required to withdraw them. Multiple staking arrangements are necessary when the device to be anchored might be subject to relatively large forces attempting to withdraw the stake from the ground. This situation frequently occurs in anchoring traps for larger animals which are strong enough to pull a single stake out of the ground. In those prior art stakes which do permit multiple staking arrangements, the universal connection described above is usually defeated during such usage, or else additional hardware is required.

Accordingly, a need remains for a stake assembly for animal traps in order to overcome the above-noted shortcomings. The present invention satisfies such a need by providing a stake assembly that is convenient and easy to use, sturdy in design, and reliable. Such a stake assembly permits a pair of outward canted stakes to be used to hold the assembly in place. This provides a much higher degree of retention force than conventional single stake based securing methods. Its small size and simple design endows it with a modest price, while its heavy steel construction makes it strong and durable for extended periods of outdoor use.

BRIEF SUMMARY OF THE INVENTION

In view of the foregoing background, it is therefore an object of the present invention to provide a stake assembly for animal traps. These and other objects, features, and advantages of the invention are provided by a ground anchoring stake assembly for effectively securing animal traps to a ground surface.

The stake assembly includes an anchor plate formed from hardened material. Such an anchor plate is formed from steel. The anchor plate has a centrally disposed longitudinal axis and further has opposing sides equidistantly spaced from the axis. Such sides extend parallel to the axis and travel along an entire length of the anchor plate. The anchor plate is further provided with a plurality of spaced apertures formed therein. Such an anchor plate preferably has a rectangular shape and the apertures include first and second apertures equidistantly spaced along the axis.

In an alternate embodiment, the anchor plate preferably includes a plurality of linear creases traversing the axis and equidistantly spaced along a longitudinal length thereof. Such an anchor plate further includes a plurality of monolithically formed and coextensively shaped sections separated by the creases. The apertures including first, second and third apertures centrally registered within the sections wherein the first and third sections are beveled upwardly and outwardly away from the second section such that the second section rests directly on the ground surface while the first and third sections flange upwardly away from the ground surface. The first and third sections preferably laterally diverge from the second section at an oblique angle defined less than 90 degrees measured from the ground surface. The at least one stake includes first and second stakes independently passed through the first and third apertures for securely maintaining the anchor plate engaged with the ground surface during operating conditions.

In another embodiment, the anchor plate preferably has a square shape and the apertures include first, second and third apertures seated at opposing corners of the anchor plate. Such an anchor plate further includes a monolithically formed shaft protruding vertically upward from a center thereof.

At least one elongated stake is removably inserted through at least one of the apertures and directly interfitted into the ground surface in such a manner that the anchor plate is advantageously and effectively prohibited from being disengaged from the ground surface while the stake is traversed therethrough. Such a stake preferably has a chamfered exterior surface for advantageously and effectively maximizing surface area contact below the ground surface.

A flexible and elongated chain includes a plurality of substantially annular child links directly connected end-to-end. Such a chain further includes a plurality of parent links that have a greater thickness and a greater diameter than a diameter and a thickness of the child links respectively. The parent links are directly and permanently fastened to another one of the apertures and the animal trap respectively. Such parent links are directly and permanently fastened to outer ones of the child links respectively. The chain is formed from steel. The anchor plate and the at least one stake effectively resist external forces acting on the chain so that the animal trap is advantageously prevented from moving beyond a maximum distance defined by a longitudinal length of the chain.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a perspective view showing a stake assembly for animal traps, in accordance with the present invention;

FIG. 2 is a perspective view of the assembly shown in FIG. 1, showing the stake removed from the ground surface;

DETAILED DESCRIPTION OF THE INVENTION

Figure 4:
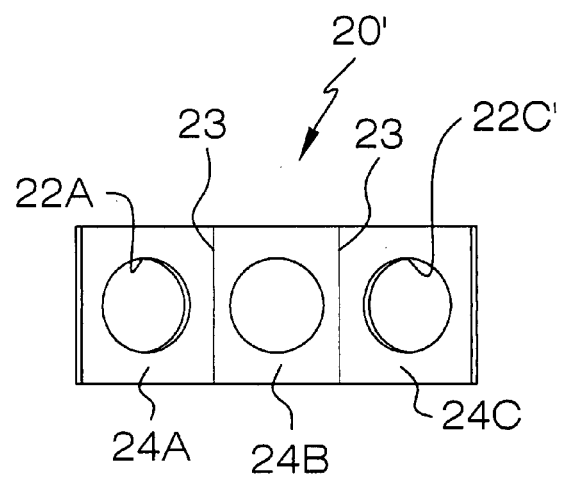
FIG. 4 is a top plan view showing an alternate embodiment of the anchor plate, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime and double prime numbers refer to alternate embodiments of such elements.

The assembly of this invention is referred to generally in FIGS. 1-6 by the reference numeral 10 and is intended to provide a stake assembly for animal traps. It should be understood that the assembly 10 may be used to stake many different types of items to ground surfaces and should not be limited in use to only staking animal traps to a ground surface.

Referring initially to FIGS. 1 and 2, the assembly 10 includes an anchor plate 20 formed from hardened material. Such an anchor plate 20 is formed from steel which is important for allowing same to resist excessive physical forces when an animal is pulling on the chain 40 (described herein below). The anchor plate 20 has a centrally disposed longitudinal axis and further has opposing sides 21 equidistantly spaced from the axis. Such sides 21 extend parallel to the axis and travel along an entire length of the anchor plate 20. The anchor plate 20 is further provided with a plurality of spaced apertures 22 formed therein. Such an anchor plate 20 has a rectangular shape and the apertures 22 include first 22A and second 22B apertures equidistantly spaced along the axis.

Figure 5:
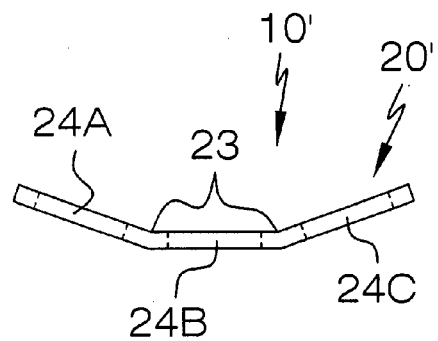
FIG. 5 is a side-elevational view of the anchor plate shown in FIG. 4, showing the upwardly flanged nature of the first and third sections.
Figures 6, 7:
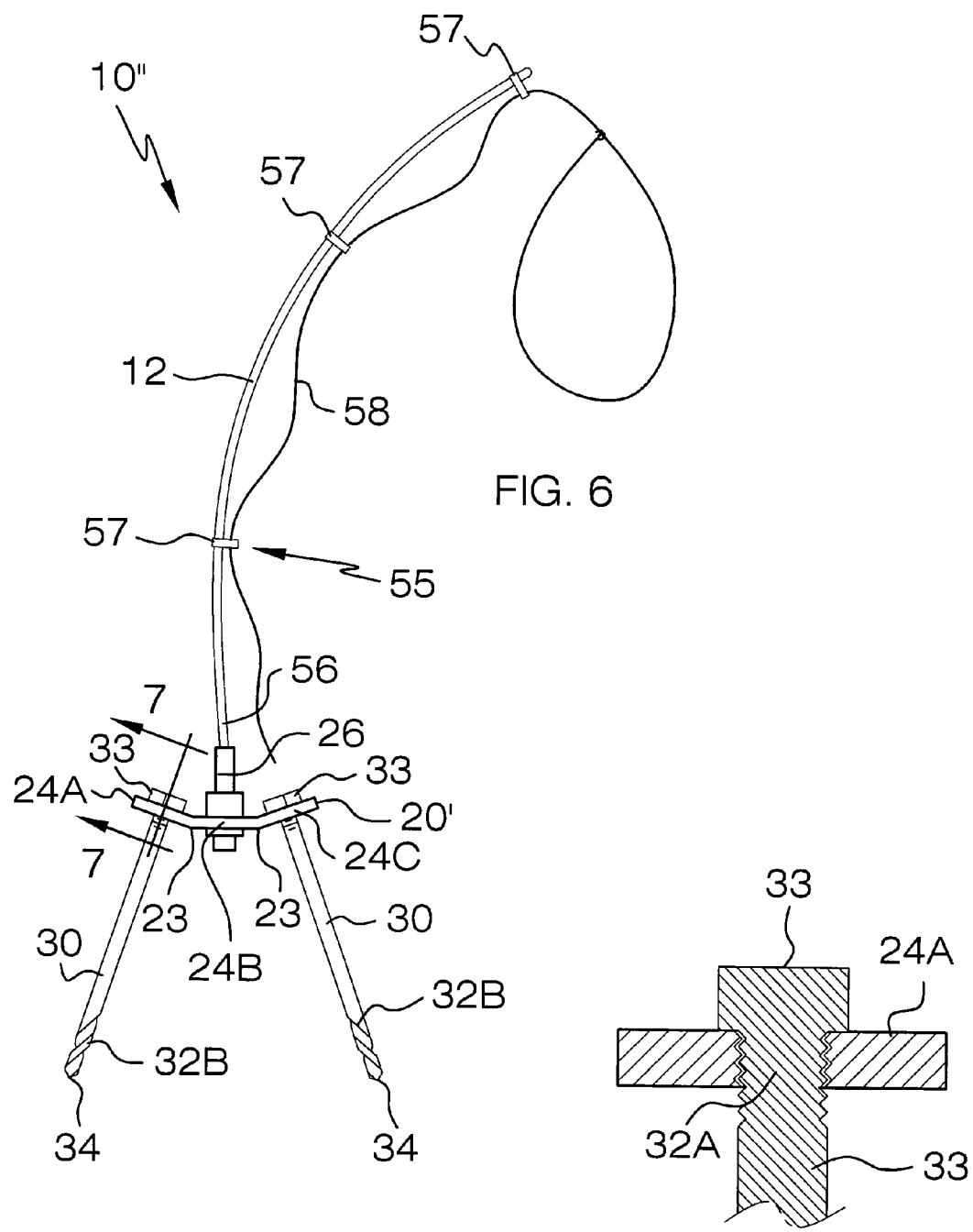
FIG. 6 is a side-elevational view of the anchor plate shown in FIG. 1, showing a snare trap attached thereto.
FIG. 7 is an enlarged cross-sectional view of a fastener threadably engaged directly with the anchor plate, as shown in FIG. 6.

Referring to FIGS. 4, 5 and 6, in an alternate embodiment 10', the anchor plate 20' includes a plurality of linear creases 23 traversing the axis and equidistantly spaced along a longitudinal length thereof. Such an anchor plate 20' further includes a plurality of monolithically formed and coextensively shaped sections 24 separated by the creases 23. The apertures 22' including first 22A', second 22B' and third 22C' apertures centrally registered within the sections 24 wherein the first 24A and third 24C sections are beveled upwardly and outwardly away from the second section 24B such that the second section 24B rests directly, without the use of intervening elements, on the ground surface 11 while the first 24A and third 24C sections flange upwardly away from the ground surface 11.

Such first 24A and third 24C sections laterally diverge from the second section 24B at an oblique angle defined less than 90 degrees measured from the ground surface 11. The at least one stake 30 (described herein below) includes first and second stakes independently passed through the first 22A' and third 22C' apertures for securely maintaining the anchor plate 20' engaged with the ground surface 11 during operating conditions.

Figure 3:
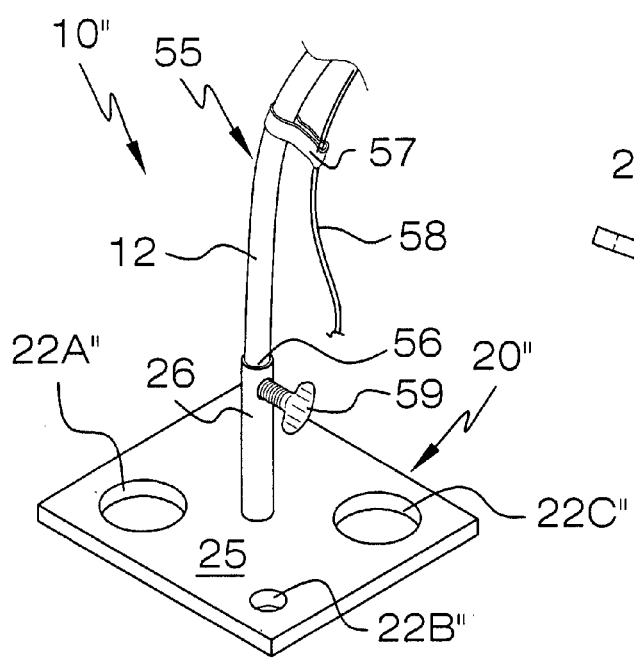
FIG. 3 is a perspective view showing another embodiment of the anchor plate, in accordance with the present invention.

Referring to FIG. 3, in another embodiment 10'', the anchor plate 20'' has a square shape and the apertures 22'' include first 22A'', second 22B'' and third 22C'' apertures seated at opposing corners 25 of the anchor plate 20''. Such an anchor plate 20'' further includes a monolithically formed shaft 26 protruding vertically upward from a center thereof. The shaft 26 is essential for allowing a snare trap 12 or various other types of animal traps 12 to be attached to the anchor plate 20''.

Referring to FIGS. 3 and 6, the stake assembly 10'' further includes an animal trap 55 provided with an elongated and flexible body 12 having a bottom end 56 interfitted directly into the shaft 26 in such a manner that the body 12 is vertically supported during operating conditions. The animal trap 55 includes a plurality of rigid cups 57 positioned about the body 12 and disposed adjacent the bottom end 56. Such rigid cups 57 are critical and necessary for insuring the body 12 maintains the string 58 at a cocked position during extended periods of time. The string 58 is passed through a top end of the body and support by a top one of the rigid cups. The anchor plate 20'' further includes a threaded screw 59 directly positioned through the shaft 26 and abutted against the bottom end 56 of the body 12 for preventing the body 12 from disengaging the shaft 56 during operating conditions. Referring to FIGS. 6 and 7, it is noted that stakes 30 can have a threaded upper end 32A and a chamfered lower end 32B for providing a secure and static connection with the anchor plate 10'' and a ground surface, respectively.

Referring to FIGS. 1, 2 and 6, at least one elongated stake 30 is removably inserted through at least one of the apertures 22 and directly interfitted, without the use of intervening elements, into the ground surface 11 in such a manner that the anchor plate 20 is advantageously and effectively prohibited from being disengaged from the ground surface 11 while the stake 30 is traversed therethrough. Such a stake 30 has a chamfered exterior surface 31 that is crucial for advantageously and effectively maximizing surface area contact below the ground surface 11.

The stake further includes axially opposed end portions 32, wherein one end portion 32A includes a annular plate 33 monolithically formed therewith that is important for allowing a user to insert the stake 30 into the ground surface with the use of a striking implement, such as a hammer. The other end portion 32B tapers to a point 34 that is essential for allowing the stake 30 to be easily displaced through the ground surface 11.

Referring to FIGS. 1 and 2, a flexible and elongated chain 40 includes a plurality of substantially annular child links 41 directly connected, without the use of intervening elements, end-to-end. Such a chain 40 further includes a plurality of parent links 42 that have a greater thickness and a greater diameter than a diameter and a thickness of the child links 41 respectively. The parent links 42 are directly and permanently fastened, without the use of intervening elements, to another one 22B of the apertures 22 and the animal trap 12 respectively. Such parent links 42 are directly and permanently fastened, without the use of intervening elements, to outer ones 41A of the child links 41 respectively. The chain 40 is formed from steel which is vital for allowing same to resist excessive physical forces when an animal is pulling thereon. The anchor plate 20 and the at least one stake 30 effectively resist external forces acting on the chain 40 so that the animal trap 12 is advantageously prevented from moving beyond a maximum distance defined by a longitudinal length of the chain 40.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A ground anchoring stake assembly for securing animal traps to a ground surface, said stake assembly comprising:

an anchor plate formed from hardened material, said anchor plate being formed from steel, said anchor plate having a centrally disposed longitudinal axis and further having opposing sides equidistantly spaced from the axis, said sides extending parallel to the axis and traveling along an entire length of said anchor plate, said anchor plate being provided with a plurality of spaced apertures formed therein;

at least one elongated stake removably inserted through at least one said apertures and directly interfitted into the ground surface in such a manner that said anchor plate is prohibited from being disengaged from the ground surface while said stake is traversed therethrough; and a flexible and elongated chain including a plurality of substantially annular child links directly connected end-to-end, said chain further including a plurality of parent links having a greater thickness and a greater diameter than a diameter and a thickness of said child links, said parent links being directly and permanently fastened to another one of said apertures and the animal trap respectively, said parent links being directly and permanently fastened to outer ones of said child links respectively;

wherein said anchor plate and said at least one stake resist external forces acting on said chain so that the animal trap is prevented from moving beyond a maximum distance defined by a longitudinal length of said chain;

wherein said anchor plate has a square shape and said apertures include first, second and third apertures formed in said anchor plate, said anchor plate further including a monolithically formed shaft protruding vertically upward from a center thereof, said stake assembly further including an animal trap provided with an elongated and flexible body having a bottom end intermitted directly into said shaft in such a manner that said body is vertically supported during operating conditions, said animal trap including a plurality of rigid cups positioned about said body, said animal trap further including a string passed through a top end of said body and supported by a top one of said rigid cups, said anchor plate further including a threaded screw directly positioned through said shaft and abutted against said bottom end of said body for preventing said body from disengaging said shaft during operating conditions.

2. The stake assembly of claim 1, wherein said anchor plate has a rectangular shape and said apertures include first and second apertures equidistantly spaced along the axis.

3. The stake assembly of claim 1, wherein said stake has a chamfered exterior surface for maximizing surface area contact below the ground surface.

4. The stake assembly of claim 1, wherein said anchor plate includes a plurality of linear creases traversing the axis and equidistantly spaced along a longitudinal length thereof, said anchor plate further including a plurality of monolithically formed and coextensively shaped sections separated by said creases, said apertures including first, second and third apertures centrally registered within said sections wherein first and third ones of said coextensively shaped sections are beveled upwardly and outwardly away from a second one of said coextensively shaped sections such that said second section rests directly on the ground surface while said first and third sections flange upwardly away from the ground surface, said at least one stake including first and second stakes independently passed through said first and third apertures for securely maintaining said anchor plate engaged with the ground surface during operating conditions.

5. The stake assembly of claim 4, wherein said first and third sections laterally diverge from said second section and at an oblique angle defined less than 90 degrees measured from the ground surface.

6. A ground anchoring stake assembly for securing animal traps to a ground surface, said stake assembly comprising:

an anchor plate formed from hardened material, said anchor plate being formed from steel, said anchor plate having a centrally disposed longitudinal axis and further having opposing sides equidistantly spaced from the axis, said sides extending parallel to the axis and traveling along an entire length of said anchor plate, said anchor plate being provided with a plurality of spaced apertures formed therein;

at least one elongated stake removably inserted through at least one said apertures and directly interfitted into the ground surface in such a manner that said anchor plate is prohibited from being disengaged from the ground surface while said stake is traversed therethrough; and
a flexible and elongated chain including a plurality of substantially annular child links directly connected end-to-end, said chain further including a plurality of parent links having a greater thickness and a greater diameter than a diameter and a thickness of said child links, said parent links being directly and permanently fastened to another one of said apertures and the animal trap respectively, said parent links being directly and permanently fastened to outer ones of said child links respectively, wherein said chain is formed from steel;
wherein said anchor plate and said at least one stake resist external forces acting on said chain so that the animal trap is prevented from moving beyond a maximum distance defined by a longitudinal length of said chain;
wherein said anchor plate has a square shape and said apertures include first, second and third apertures formed in said anchor plate, said anchor plate further including a monolithically formed shaft protruding vertically upward from a center thereof, said stake assembly further including an animal trap provided with an elongated and flexible body having a bottom end interfitted directly into said shaft in such a manner that said body is vertically supported during operating conditions, said animal trap including a plurality of rigid cups positioned about said body, said animal trap further including a string positioned along a top end of said body and supported by a top one of said rigid cups, said anchor plate further including a threaded screw directly positioned through said shaft and abutted against said bottom end of said body for preventing said body from disengaging said shaft during operating conditions.

7. The stake assembly of claim 6, wherein said anchor plate has a rectangular shape and said apertures include first and second apertures equidistantly spaced along the axis.

8. The stake assembly of claim 6, wherein said stake has a chamfered exterior surface for maximizing surface area contact below the ground surface.

9. The stake assembly of claim 6, wherein said anchor plate includes a plurality of linear creases traversing the axis and equidistantly spaced along a longitudinal length thereof, said anchor plate further including a plurality of monolithically formed and coextensively shaped sections separated by said creases, said apertures including first, second and third apertures centrally registered within said sections wherein first and third ones of said coextensively shaped sections are beveled upwardly and outwardly away from a second one of said coextensively shaped sections such that said second section rests directly on the ground surface while said first and third sections flange upwardly away from the ground surface, said at least one stake including first and second stakes independently passed through said first and third apertures for securely maintaining said anchor plate engaged with the ground surface during operating conditions.

10. The stake assembly of claim 9, wherein said first and third sections laterally diverge from said second section and at an oblique angle defined less than 90 degrees measured from the ground surface.

* * * * *